(12) United States Patent
Fukuda

(10) Patent No.: US 8,248,629 B2
(45) Date of Patent: Aug. 21, 2012

(54) IMAGE FORMING APPARATUS WITH A POWER MODE CONTROL SECTION FOR ALLOCATING A PRINTOUT FOR A RESERVED LOW-KEY PRINT SETTING JOB

(75) Inventor: Naoki Fukuda, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 781 days.

(21) Appl. No.: 12/215,020

(22) Filed: Jun. 23, 2008

(65) Prior Publication Data

US 2008/0316532 A1 Dec. 25, 2008

(30) Foreign Application Priority Data

Jun. 21, 2007 (JP) ................................. 2007-164193
Jun. 25, 2007 (JP) ................................. 2007-166754

(51) Int. Cl.
*G06K 15/00* (2006.01)
(52) U.S. Cl. .................... 358/1.14; 713/320; 713/324
(58) Field of Classification Search .......... 358/1.1–3.23, 358/448; 382/115–140
See application file for complete search history.

(56) References Cited

U.S. PATENT DOCUMENTS

| | | | |
|---|---|---|---|
| 5,933,686 | A | 8/1999 | Ootsuka et al. |
| 6,125,249 | A | 9/2000 | Ootsuka et al. |
| 2001/0012122 | A1* | 8/2001 | Ueda ............................ 358/1.15 |
| 2001/0038759 | A1 | 11/2001 | Kawabe |
| 2002/0149789 | A1* | 10/2002 | Okazawa ..................... 358/1.14 |
| 2006/0279766 | A1* | 12/2006 | Kobayashi ................... 358/1.14 |
| 2007/0009154 | A1* | 1/2007 | Iwabayashi et al. .......... 382/176 |

FOREIGN PATENT DOCUMENTS

| | | |
|---|---|---|
| CN | 1791515 | 6/2006 |
| EP | 1122635 | 8/2001 |
| JP | 1-264865 | 10/1989 |
| JP | 7-123236 | 5/1995 |
| JP | 9-186803 | 7/1997 |
| JP | 2001-251464 | 9/2001 |

(Continued)

OTHER PUBLICATIONS

Japanese English Translation of Hirofumi et al. Pub. No. 01-264865, Printing Output Control Apparatus of Printer, Oct. 23, 1989.*
Japanese English Translation of Senichi et al. Pub. No. 2004-230617, Network Printer System, Backup Program, and Method of Backup, Aug. 19, 2004.*

*Primary Examiner* — Benny Q Tieu
*Assistant Examiner* — Marcellus Augustin
(74) *Attorney, Agent, or Firm* — Jordan and Hamburg LLP

(57) ABSTRACT

A job managing section acquires an operational status of a standby print job when a determination that a job having been accepted by a job accepting section is a reserved low-key print setting job is made, as a result of a determination by a reserved setting determining section, and also allocates a printout for the reserved low-key print setting job to an available time slot based on the acquired operational status. As a result, the printout for the reserved low-key print setting job can be executed in an available time slot which is different from a time slot for the standby print job. Accordingly, mixing of printed sheets related to a plurality of print jobs can be prevented as much as possible, and a contribution to an improvement in convenience at the user-side can be made.

7 Claims, 5 Drawing Sheets

| | Operation panel section | Engine section | Facsimile communication section |
|---|---|---|---|
| Ready mode (normal mode) | Power supplied | Power supplied | Power supplied |
| First power saving mode | Power unsupplied | Power supplied | Power supplied |
| Second power saving mode | Power unsupplied | Power unsupplied | Power supplied |
| Third power saving mode | Power unsupplied | Power unsupplied | Power supplied (but special power saving mode) |

FOREIGN PATENT DOCUMENTS

| | | |
|---|---|---|
| JP | 2001-306655 | 11/2001 |
| JP | 2004-106994 | 4/2004 |
| JP | 2004-230617 | 8/2004 |
| JP | 2006-025137 | 1/2006 |

* cited by examiner

Fig.5

| | Operation panel section | Engine section | Facsimile communication section |
|---|---|---|---|
| Ready mode (normal mode) | Power supplied | Power supplied | Power supplied |
| First power saving mode | Power unsupplied | Power supplied | Power supplied |
| Second power saving mode | Power unsupplied | Power unsupplied | Power supplied |
| Third power saving mode | Power unsupplied | Power unsupplied | Power supplied (but special power saving mode) |

IMAGE FORMING APPARATUS WITH A POWER MODE CONTROL SECTION FOR ALLOCATING A PRINTOUT FOR A RESERVED LOW-KEY PRINT SETTING JOB

TECHNICAL FIELD

The present invention relates to an image forming apparatus provided with a job management function and, in particular, an image forming apparatus capable of preventing printed sheets related to a plurality of print jobs from being mixed as much as possible and of significantly improving the convenience of users.

BACKGROUND ART

Conventionally, an image forming apparatus provided with a job management function that is connected between a plurality of information processors (hereinafter sometimes referred to as user terminals) provided for respective users via a network, accepts a print job from each user terminal and executes the accepted print job which is subjected to management in a predetermined order has been known. See Japanese Published Unexamined Patent Application No. 2006-025137, for example.

The aforementioned conventional image forming apparatus includes a paper type information acquisition section, a determination section making a determination on whether a job can be output with currently loaded transfer paper, based on paper type information, and a control section controlling, at the time of output, to notify a job which has been determined by the determination section to be printable with the currently loaded transfer paper, and also to change the order of a job which is not printable with the currently loaded transfer paper into one after printable jobs. When a "check" button is pressed, for example, the control section is configured to display a job which can be output with the currently loaded transfer paper. When a "compilation" button is pressed, the control section is configured to compile and bring executable jobs to the beginning in output order, that is, to change the order of a job which cannot be output with the currently loaded transfer paper into one after the printable jobs.

According to the aforementioned conventional image forming apparatus, jobs can be processed efficiently.

However, it can happen in the conventional job management technique that printed sheets for each user are mixed, for example, when the image forming apparatus performs a printout based on a command from each of the plurality of user terminals via a network and also when printed sheets for each user related to a plurality of print jobs are discharged to a common paper output tray. In this case, it is also possible that a user takes away a printed sheet for other users by mistake. In such a case, if the printed sheet accidentally taken away by the wrong user pertains to confidentiality, unforeseen trouble that cannot be overlooked may result.

SUMMARY OF THE INVENTION

Accordingly, an object of the present invention is to provide an image forming apparatus capable of preventing printed sheets related to a plurality of print jobs from being mixed as much as possible and of significantly improving the convenience of users.

In order to achieve the aforementioned object, an image forming apparatus according to the present invention, configured to have an accepting section connected between a plurality of user terminals via a network and accepting print jobs from the plurality of user terminals and a job managing section managing a plurality of print jobs having been accepted by the accepting section and to execute print jobs subjected to management in a predetermined order, includes a determining section making a determination on whether a print job having been accepted by the accepting section is a reserved low-key print setting job, wherein the job managing section acquires an operational status of a standby print job when a determination that the job having been accepted by the accepting section is a reserved low-key print setting job is made, as a result of the determination by the determining section, and also allocates a printout for the reserved low-key print setting job to an available time slot based on the acquired operational status.

The present invention can also adopt a configuration that the job managing section executes the printout for the reserved low-key print setting job after a relevant user is granted permission.

Furthermore, the present invention can adopt a configuration of further including a power mode control section taking control of changing the power mode of the apparatus at a plurality of levels according to predetermined conditions, wherein the job managing section acquires a transition status of the power mode of the apparatus from the power mode control section when a determination that the job having been accepted by the accepting section is a reserved low-key print setting job is made, as a result of the determination by the determining section, and also allocates a printout for the reserved low-key print setting job to a time slot which is different from a time slot for a standby print job and also based on the acquired transition status.

Still further, the present invention can adopt a configuration that the job managing section acquires from the power mode control section a timing when the power mode of the apparatus transitions to a power saving mode, when a determination that the job having been accepted by the accepting section is a reserved low-key print setting job is made, as a result of the determination by the determining section, and also allocates a printout for the reserved low-key print setting job to a time slot based on the acquired transition timing.

Moreover, the present invention may adopt a configuration that the job managing section acquires a transition status of the power mode of the apparatus from the power mode control section when the job having been accepted by the accepting section is determined to be a plurality of reserved low-key print setting jobs, as a result of the determination by the determining section, and also allocates each printout for the plurality of reserved low-key print setting jobs to a time slot at a transition stage among a plurality of transition stages based on the acquired transition status, the transition stage being different from one another.

The present invention can also adopt a configuration that the job managing section provides an index that the reserved low-key print setting job has been completed, after the printout for the reserved low-key print setting job is completed.

Still further, the present invention may adopt a configuration that the job managing section allocates an output destination for a printout for the reserved low-key print setting job to an output destination which is different from that of ordinary print jobs.

The present invention can also adopt a configuration that the job managing section allocates a printout for the reserved low-key print setting job to a time slot just before the apparatus is shut down.

OPERATION AND EFFECTS OF THE INVENTION

In the image forming apparatus according to the present invention, the determining section determines whether a print job having been accepted by the accepting section is a reserved low-key print setting job. When a determination that the job having been accepted by the accepting job is a reserved low-key print setting job is made, as a result of the determination by the determining section, the job managing section acquires an operational status of a standby print job and allocates a printout for the reserved low-key print setting job to an available time slot based on the thus acquired operational status. By doing this, a printout for the reserved low-key print setting job is allocated to and executed in an available time slot which is different from a time slot for the standby print job. As a result, situations where printed sheets related to a plurality of print jobs are mixed with a printed sheet related to a reserved low-key print setting job can be prevented as much as possible, and a contribution to an improvement in convenience at the user-side can be made.

BRIEF DESCRIPTION OF THE DRAWINGS

FIG. 5 is a diagram provided for an explanation of an operation in the second image forming apparatus.

DETAILED DESCRIPTION OF THE INVENTION

Hereinafter, image forming apparatuses according to embodiments of the present invention are described in detail with reference to the drawings.

As a precondition, a plurality of information processors such as personal computers (hereinafter, referred to as user terminals) are connected to the image forming apparatuses according to the present invention via a network. The image forming apparatuses according to the present invention have a function of accepting print jobs from the user terminals and executing job management of the accepted print jobs.

First Embodiment

First, a first image forming apparatus 10 according to the first embodiment is described with reference to FIG. 1.

(Block Configuration Around the First Image Forming Apparatus 10)

Figure 1:
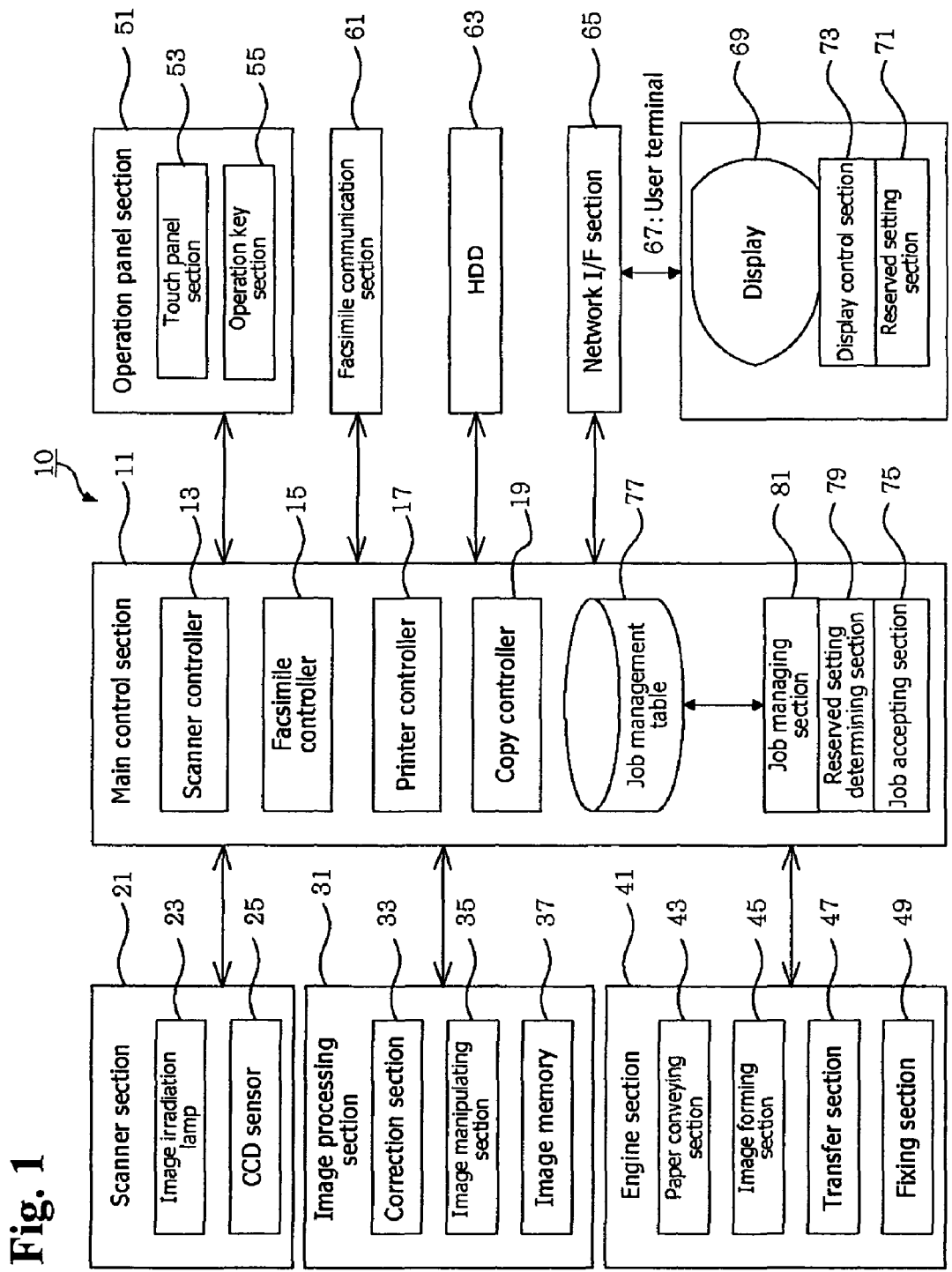
FIG. 1 is a block diagram showing a general configuration of a periphery of a first image forming apparatus according to a first embodiment of the present invention.

As shown in FIG. 1, a variety of functions including a copy job, a facsimile transmission job, a scanner job, a print job and a data communications job are available in the image forming apparatus 10 according to the first embodiment. The apparatus 10 is controlled by a main control section 11 composed of a microcomputer and dedicated hardware circuitry. As input/output devices connected to the main control section 11 and taking charge of various functions, the image forming apparatus 10 includes a scanner section 21, an image processing section 31, an engine section 41, an operation panel section 51, a facsimile communication section 61, a hard disk drive (HDD) 63 and a network interface (I/F) section 65.

The main control section 11 houses a scanner controller 13 controlling an operation for achieving a scanner function, a facsimile controller 15 controlling an operation for achieving a facsimile function, a printer controller 17 controlling an operation for achieving a printer function and a copy controller 19 controlling an operation for achieving a copy function. The main control section 11 assumes overall control for an operation of the entire apparatus.

The scanner section 21 includes an image irradiation lamp 23 and a charge coupled device (CCD) sensor 25 constituting a scanner (not shown). The image irradiation lamp 23 irradiates a document and the CCD sensor 25 receives its reflected light, whereby the scanner section 21 reads out an image from the document and outputs image data corresponding to the read-out image to the image processing section 31.

The image processing section 31 includes a correction section 33, an image manipulating section 35 and an image memory 37. The image processing section 31 processes the image data having been read by the scanner section 21, by means of the correction section 33 and the image manipulating section 35 as needed, and stores the processed image data on the image memory 37 or outputs the processed image data to the engine section 41 and the facsimile communication section 61. The correction section 33 makes a predetermined correction such as level correction, gamma correction and the like to the image data which has been read by the scanner section 21. The image manipulating section 35 executes a variety of manipulating processings such as compression or expansion and scaling of image data.

The engine section 41 includes a paper conveying section 43 composed of a paper feeding cassette, a paper feeding roller, etc., which are not shown, an image forming section 45 composed of a photosensitive drum, an exposure system, a development system, etc., which are not shown, a transfer section 47 composed of a transfer roller, etc., (not shown) and a fixing section 49 composed of a fixing roller, etc., (not shown). The engine section 41 prints out an image on a sheet of paper using image data which has been read by the scanner section 21, image data which has been transmitted from a client personal computer (PC) by a local area network (LAN) via the network I/F section 65 and image data of facsimile data which has been received from an external facsimile machine by the facsimile communication section 61. More specifically, the paper conveying section 43 conveys a sheet of paper to the image forming section 45, which forms a toner image corresponding to the foregoing image data. The transfer section 47 transfers the toner image to the sheet of paper. The fixing section 49 fixes the toner image on the sheet of paper to form an image.

The operation panel section 51 includes a touch panel section 53 and an operation key section 55. The operation panel section 51 is used so that a user may perform an operation related to a scanner function, a facsimile function, a printer function or a copy function. The operation panel section 51 provides the main control section 11 with an operation command, etc., by the user.

The touch panel section 53 is composed of a touch panel unit combined with a touch panel and a color liquid crystal display (LCD). The touch panel section 53 displays a variety of operation screens, for example, information on a document size, a copy size and the number of copies in executing the copy function and also displays an operation button so that the user may input a variety of operation commands by touching the corresponding part.

The operation key section 55 includes a plurality of operation keys to accept an operation input by the user. The operation key section 55 is used, for example, when the user selectively executes a key input operation of a necessary function from among a variety of functions such as a copy function, a printer function, a scanner function and a facsimile function or when the user inputs the number of copies and a command to execute copying.

The facsimile communication section 61 includes an encoding/decoding section (not shown), a modulation and demodulation section (not shown) and a network control unit (NCU) (not shown). The facsimile communication section 61 transmits image data of a document which has been read by the scanner section 21, to a facsimile machine via a telephone line and receives image data which has been transmitted by a facsimile machine.

The HDD 63 stores image data which has been read by the scanner section 21 and a variety of data such as output format set in the image data. The image data stored in the HDD 63 is not only used inside a printer driver, a program and a recording medium but also checked from a client PC, etc., via the network I/F section 65 or transferred to a predetermined folder on a client PC, a file transfer protocol (FTP) server, etc., if necessary.

The network I/F section 65 controls transmission and reception of a variety of data related to a user terminal 67 such as client PC, etc., connected via the LAN, by use of a network interface (10/100Base-TX). More specifically, the network I/F section 65, for example, receives a print job request signal having been transmitted from the user terminal 67 and forwards the received signal to the main control section 11. At the same time, the network I/F section 65 receives information of a management schedule for the related print job request having been replied from the main control section 11 and forwards the received information to the user terminal 67.

The user terminal 67 includes a display 69 in order to display operational details of print job settings in the user terminal 67. The user terminal 67 also includes, for example, a reserved setting section 71 setting a reserved low-key print function for a print job related to a document requiring security management and a display control section 73 taking control of displaying operational details of the reserved low-key print function setting in order to avoid situations where printed sheets related to a plurality of print jobs are mixed.

In order to avoid situations as much as possible where a printed sheet related to a print job containing the reserved setting is mixed with printed sheets related to a plurality of print jobs when the main control section 11 accepts the former print job from the user terminal 67, the main control section 11 includes a job accepting section (corresponding to an "accepting section" in the present invention) 75 accepting a print job from the user terminal 67, a job management table 77 for managing the print job having been accepted from the user terminal 67, a reserved setting determining section (corresponding to a "determining section" in the present invention) 79 determining whether the print job having been accepted by the job accepting section 75 is a job related to the reserved low-key print setting and a job managing section 81 having a function of referring to the job management table 77 to acquire an operational status of a standby print job when a determination that the job having been accepted by the job accepting section 75 is a job related to the reserved low-key print setting is made, as a result of the determination in the reserved setting determining section 79, and a function for allocating a printout for the reserved low-key print setting job to an available time slot based on the acquired operational status.

(Operation of the First Image Forming Apparatus 10)

Next, an operation of the first image forming apparatus 10 is described with reference to FIG. 2.

Hereinafter, unless otherwise described, an explanation of the operation is given on the precondition that a user attempting processing of a print job in the first image forming apparatus 10 performs an input operation of user identification information and password (authentication information) via the user terminal 67 and also an input operation of the reserved low-key print setting related to a print job for a document requiring security management in order to avoid situations where printed sheets related to a plurality of print jobs are mixed.

Figure 2:
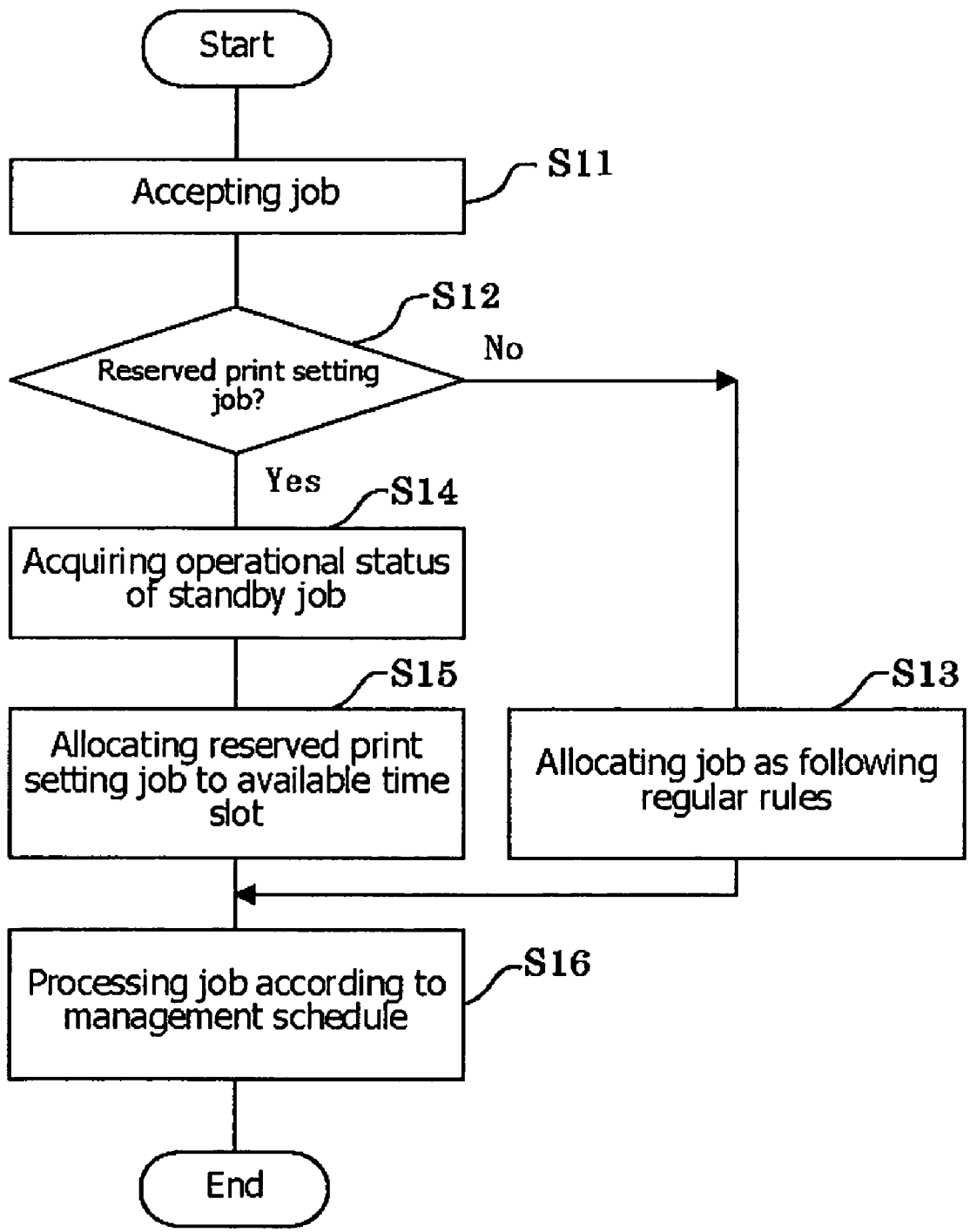
FIG. 2 is an operational flowchart of the first image forming apparatus.

Upon receiving the print job for the document involving the aforementioned reserved low-key print setting, as shown in FIG. 2, the main control section 11 performs log-in authentication on whether the login user logging in is a registered user by checking the input user identification information against pre-registered user identification information. When the login user is authenticated as a registered user, as a result of the log-in authentication, the main control section 11 accepts the print job for the document (step S11).

Next, the main control section 11 determines whether the print job having been accepted at step S11 is a reserved low-key print setting job (step S12).

When a determination that the print job having been accepted at step S11 is not a reserved low-key print setting job is made, unlike the foregoing precondition, as a result of the reserved setting determination at step S12, the main control section 11 follows regular rules and performs processing for allocating the job to an appropriate time slot in the management schedule (step S13).

On the other hand, when a determination that the print job having been accepted at step S11 is a reserved low-key print setting job is made, according to the foregoing precondition, as a result of the reserved setting determination at step S12, the main control section 11 refers to the job management table 77 to acquire an operational status of a standby print job (step S14) and also performs processing for allocating a printout for the reserved low-key print setting job to an available time slot in the management schedule based on the acquired operational status (step S15).

After the allocation processing to the management schedule at step S13 or S15, the main control section 11 executes processing for a variety of jobs including print jobs according to the allocated management schedule (step S16).

(Operation and Effects of the First Image Forming Apparatus 10)

According to the first image forming apparatus 10, as described above, the job managing section 81 acquires an operational status of a standby print job when a determination that the job having been accepted by the job accepting section 75 is a reserved low-key print setting job is made, as a result of the determination by the reserved setting determining section 79. At the same time, the job managing section 81 allocates a printout for the reserved low-key print setting job to an available time slot based on the acquired operational status. Accordingly, the printout for the reserved low-key print setting job is allocated to and executed in an available time slot that is different from a time slot for the standby print job. This makes it possible to avoid mixing of a printed sheet related to a reserved low-key print setting job and printed sheets related to a plurality of print jobs and to contribute to an improvement in convenience at the user-side.

Additionally, even if a printout for a reserved low-key print setting job is allocated to and executed in an available time slot by making the reserved low-key print setting for a job related to a document requiring security management, convenience is further improved if the print job can be executed when an administrator of the document is at the site of printout.

From this standpoint, the job managing section 81 may be configured to execute a printout for the reserved low-key print setting job after a relevant user is granted permission. Thereby, execution of the print job becomes possible when the administrator of the document is at the site of the printout. Accordingly, mixing of printed sheets related to a plurality of print jobs and a printed sheet related to a reserved low-key print setting job can be completely prevented, and convenience at the user-side can be significantly improved.

Second Embodiment

Figure 3:
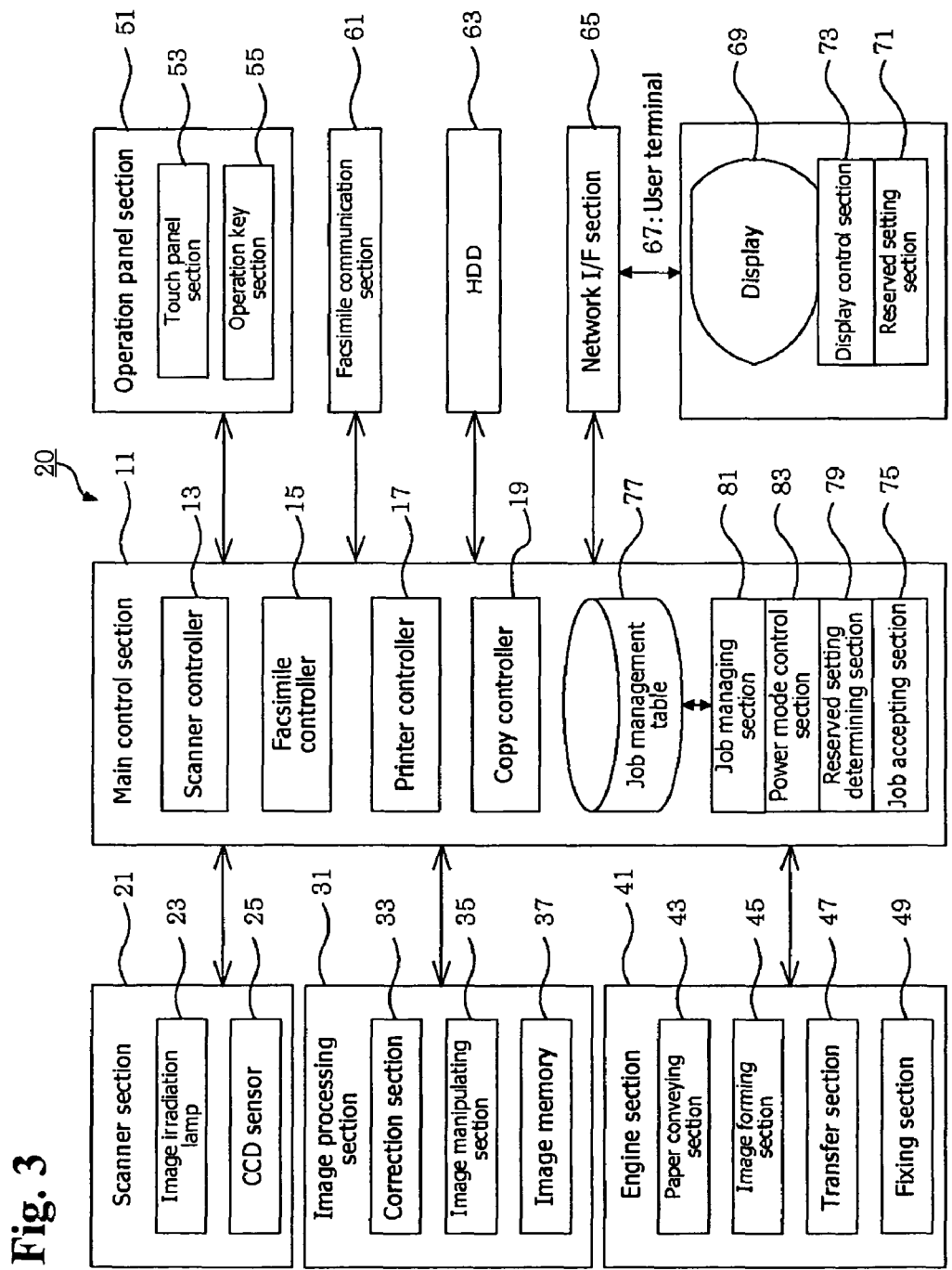
FIG. 3 is a block diagram showing a general configuration of a periphery of a second image forming apparatus according to a second embodiment of the present invention.

Next, a second image forming apparatus 20 according to a second embodiment is described with reference to FIGS. 3 to 5. Configurations of functional sections are mostly common between the first image forming apparatus 10 described above and the second image forming apparatus 20 described below. Accordingly, the functional sections in common between the first and second image forming apparatuses 10, 20 are denoted by the same symbols. An explanation will be given focusing on differences between them while overlapping explanations will be omitted.

(Block Configuration Around the Second Image Forming Apparatus 20)

Figure 4:
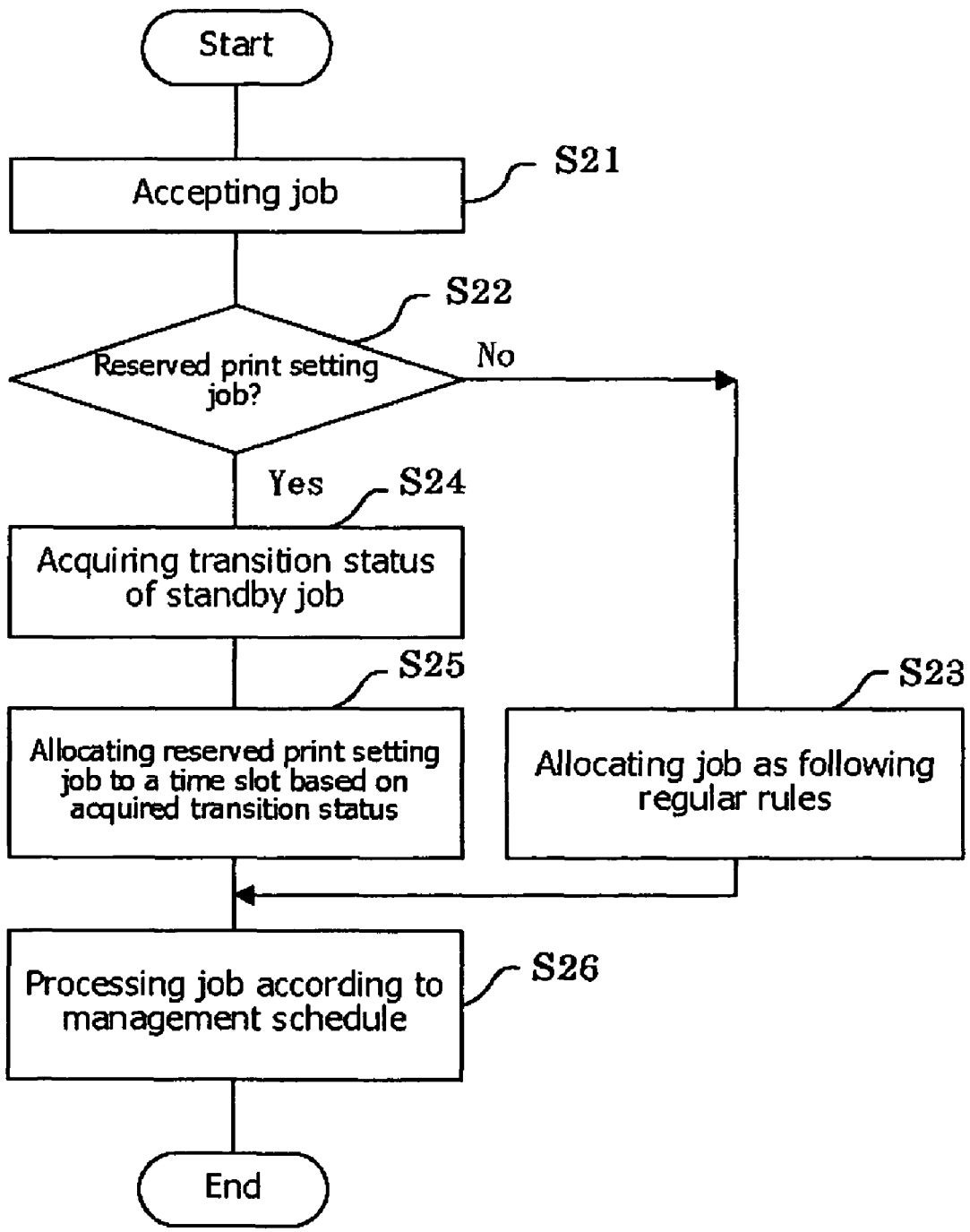
FIG. 4 is an operational flowchart of the second image forming apparatus.

As shown in FIG. 4, the second image forming apparatus 20 includes a power mode control section 83 described below in addition to the configurations of the aforementioned first image forming apparatus 10.

More specifically, in order to avoid situations as much as possible where a printed sheet related to a reserved low-key print setting job is mixed with printed sheets related to a plurality of print jobs when the main control section 11 accepts the former print job from the user terminal 67, the main control section 11 includes the job accepting section 75, the job management table 77, the reserved setting determining section 79, a power mode control section (corresponding to a "power mode control section" in the present invention) 83 taking control of changing. Accordingly, the power mode of the apparatus at a plurality of levels according to predetermined conditions, a job managing section (corresponding to a "job managing section" in the present invention) 81 having a function of acquiring a transition status of the power mode of the apparatus from the power mode control section 83 when a determination that the job having been accepted by the job accepting section 75 is a reserved low-key print setting job is made, as a result of the determination by the reserved setting determining section 79 and a function for allocating a printout for the reserved low-key print setting job to a time slot which is different from a time slot for a standby print job and also based on the acquired transition status.

(Operation of the Second Image Forming Apparatus 20)

Next, an operation of the second image forming apparatus 20 is described with reference to FIG. 4 and FIG. 5.

Prior to an explanation of the operation of the second image forming apparatus 20, power saving modes which are set in the apparatus 20 will be summarized. The second image forming apparatus 20 has power saving modes hierarchized at three levels (four levels if including normal standby mode) depending on power consumption, as shown in FIG. 5. More specifically, power is supplied to all of the operation panel section 51, engine section 41 and facsimile communication section 61 in the ready mode (normal standby mode). On the other hand, power is supplied to the engine section 41 and facsimile communication section 61 except the operation panel section 51 in a first power saving mode, and to the facsimile communication section 61 except the operation panel section 51 and engine section 41 in a second and a third power saving modes. The third power saving mode is different from the second power saving mode in operating in a special power saving mode; power supply to all electronic parts in the facsimile communication section 61 except functions that monitor start-up commands from the main control section 11 is cut off. The main control section 11 is supplied with power all the time regardless of power saving modes. According to such hierarchized power saving modes, power consumption is reduced the deeper, the hierarchy transition to the first, second and third power saving modes, as a starting at ready mode.

Hereinafter, unless otherwise described, an explanation of the operation is given on the precondition that a user attempting processing related to a print job in the apparatus 20 performs an input operation of user identification information and password (authentication information) via the user terminal 67 and also an input operation of the reserved low-key print setting related to a print job for a document requiring security management, in order to avoid situations where printed sheets related to a plurality of print jobs are mixed.

Upon receiving the print job for the document involving the reserved low-key print setting, as shown in FIG. 4, the main control section 11 checks the input user identification information, etc., against pre-registered user identification information, etc., thereby performing log-in authentication on whether the login user is a registered user. When the login user is authenticated as a registered user, as a result of the log-in authentication, the main control section 11 accepts the print job for the document (step S21).

Next, the main control section 11 determines whether the print job having been accepted at step S21 is a job related to the reserved low-key print setting (step S22).

When a determination that the print job having been accepted at step S21 is not a job related to the reserved low-key print setting is made, unlike the foregoing precondition, as a result of the reserved setting determination at step S22, the main control section 11 follows the regular rules and performs processing for allocating the job to an appropriate time slot in the management schedule (step S23).

On the other hand, when a determination that the print job having been accepted at step S21 is a job related to the reserved low-key print setting is made, according to the foregoing precondition, as a result of the reserved setting determination at step S22, the main control section 11 acquires a transition status of the power mode of the apparatus from the power mode control section 83 (step S24) and also performs processing for allocating a printout for the reserved low-key print setting job to a time slot in the management schedule, the time slot being different from a time slot for a standby print job and also based on the acquired transition status (step S25).

Here, the allocation processing at step S25 will be described. A basic concept of the allocation processing is based on that a case where the power mode in the apparatus 20 transitions from the ready mode (normal standby mode) to a power saving mode, from the first power saving mode to the second power saving mode, etc., is generally a case where a job related to the apparatus 20 is not present beyond a predetermined time. More specifically, if a printout for the reserved low-key print setting job is designed to be performed when a job related to the apparatus 20 is not present beyond a predetermined time, mixing of a plurality of printed sheets can be prevented. Thus, in the second embodiment, for example, when the power mode of the apparatus 20 transitions from the ready mode (normal standby mode) to, for example, a first power saving mode, a printout for the reserved low-key print setting job is configured to be allocated to a time slot in the management schedule, the time slot being different from a time slot for a standby print job and also based on the acquired transition status. Herein, the time slot based on the acquired transition status means in concrete terms a time slot synchronized with a timing when the power mode of the apparatus transitions from the ready mode (normal standby mode) to the first power saving mode or a time slot synchronized with a timing when the power mode of the apparatus transitions from the first to the second power saving mode, for example. Accordingly, mixing of a plurality of printed sheets can be prevented by performing a printout for a reserved low-key print setting job as synchronized with the transition timings, for example, when the power mode of the apparatus transitions from the ready mode (normal standby mode) to a power saving mode or from the first to the second power saving mode.

In addition, a situation constituting a hindrance to the image forming operation can be assumed, for example, when a printout for the reserved low-key print setting is allocated to a time slot synchronized with a timing when the power mode of the apparatus transitions from the first to the second power saving mode or from the second to the third power saving mode, on grounds that temperature at the fixing section 49 has not reached a necessary level, etc., since power supply to the engine section 41 is cut off in the second or third power saving mode. In this case, however, performing image forming processing at a lower speed than the normal image forming allows the printout for the reserved low-key print setting job to be executed without loss of image quality.

After the allocation processing to the management schedule at step S23 or S25, the main control section 11 follows the assigned management schedule and executes processing of a variety of jobs including print jobs (step S26).

(Operation and Effects of the Second Image Forming Apparatus 20)

According to the second image forming apparatus 20, as described above, the job managing section 81 acquires a transition status of the power mode of the apparatus from the power mode control section 83 when the job having been accepted by the job accepting section 75 is determined to be a reserved low-key print setting job, as a result of the determination by the reserved setting determining section 79. The job managing section 81 also allocates a printout for the reserved low-key print setting job to a time slot which is different from a time slot for a standby print job and also based on the acquired transition status. Therefore, the printout for the reserved low-key print setting job is allocated to and executed in a time slot which is different from a time slot for a standby print job and also based on the transition status of the power mode of the apparatus having been acquired from the power mode control section 83. As a result, mixing of printed sheets related to a plurality of print jobs and a printed sheet related to a reserved low-key print setting job can be prevented as much as possible, and a contribution to an improvement in convenience at the user-side can be made.

[Other]

The present invention should not be restricted to the aforementioned embodiments and can be modified as appropriate without departing from the spirit or technical ideas of the present invention understood from the claims and the entire specification. Image forming apparatuses with such modifications are also to fall within the technical scope of the present invention.

More specifically, convenience is further enhanced if a printed sheet related to a reserved low-key print setting job is output differentially from printed sheets related to other ordinary print jobs, as one of the approaches to preventing mixing of printed sheets related to a plurality of print jobs and a printed sheet related to a reserved low-key print setting job in the embodiments of the present invention, for example.

From this standpoint, the job managing section 81 may be configured to provide an index that a reserved low-key print setting job has been completed, after a printout for the reserved low-key print setting job is completed. To "provide an indication that a reserved low-key print setting job has been completed" herein includes a form in which a larger sheet of paper than the sheet having been used in the job is inserted after the reserved low-key print setting job is completed. This interleaf may be an unprinted blank sheet of paper or may clearly indicate that it is intended for differentiation of the reserved low-key print setting job. By doing this, a user who comes across a printed sheet related to a reserved low-key print setting job can recognize at a glance that the sheet is a printed sheet related to a reserved low-key print setting job. This results in preventing printed sheets related to a plurality of print jobs and a printed sheet related to a reserved low-key print setting job from being mixed, and contributing to an improvement in convenience at the user-side.

Furthermore, convenience can further be enhanced if completion of the reserved low-key print setting job can be notified to an appropriate user after a printout for the reserved low-key print setting job is completed, as one of approaches to increasing effects of mixing prevention of printed sheets related to a plurality of print jobs.

In this light, the job managing section 81 may be configured to provide an index that a reserved low-key print setting job has been completed, after a printout for the reserved low-key print setting job is completed. More specifically, to "provide an index that a reserved low-key print setting job has been completed" herein includes, for example, notifying an appropriate user that the reserved low-key print setting job has been completed, via an appropriate information communications medium such as e-mail, etc., after the reserved low-key print setting job is completed. As a result, the user having been notified of the completion can obtain the printed sheet of interest immediately after the completion of his/her own reserved low-key print setting job. As a result, situations where printed sheets related to a plurality of print jobs are mixed with a printed sheet related to a reserved low-key print setting job can be obviated, and a contribution to an improvement in convenience at the user-side can be made.

Furthermore, the job managing section 81 may be configured to allocate an output destination related to a printout for a reserved low-key print setting job to an output destination different from that of ordinary print jobs. By doing this, a user who comes across a printed sheet in the output destination different from that of ordinary print jobs can recognize at a glance that the sheet is one related to a reserved low-key print setting job. As a result, mixing of a printed sheet related to a reserved low-key print setting job and printed sheets related to a plurality of print jobs can be prevented, and a contribution to an improvement in convenience at the user-side can be made.

Furthermore, in the embodiments of the present invention, a form for allocating a printout for a reserved low-key print setting job to an available time slot based on an operational status of a standby job is exemplified in order to avoid situations where printed sheets related to a plurality of print jobs are mixed with a printed sheet related to a reserved low-key print setting job. Here, which time slot the "available time slot based on an operational status of a standby print job" means comes into a question.

In reference to this, it will suffice if an execution schedule for a standby print job and a reserved low-key print setting job is allocated to different time slots respectively to the extent that printed sheets can be prevented from being mixed, in view of the object of the present invention, that is, mixing prevention of printed sheets. The "standby print job" herein includes, as a matter of course, a print job ready and waiting at the time of accepting the reserved low-key print setting job, but also includes a print job to be input after the reserved low-key print setting job is accepted.

Finally, the present invention may adopt a configuration that the printout for the reserved low-key print setting job is allocated to a time slot just before the image forming apparatus is shut down. In other words, as an embodiment of the available time slot based on an operational status related to a standby print job, a time slot just before a shutdown of the apparatus can be adopted. By doing this, a printout for a reserved low-key print setting job can be performed in a time slot just before the apparatus is shut down, so that the initial object can be achieved without performing troublesome coordination of a management schedule.

What is claimed is:

1. An image forming apparatus comprising:
an accepting section connected between a plurality of user terminals via a network and accepting print jobs from the plurality of user terminals;
a job managing section managing a plurality of print jobs having been accepted by the accepting section and executing print jobs subjected to management in a predetermined order;
a determining section making a determination on whether a print job having been accepted by the accepting section is a job related to a reserved low-key print setting; and
a power mode control section taking control of changing power mode of the apparatus among a plurality of power levels according to at least a predetermined time passing without a print job;
wherein the job managing section acquires from the power mode control section a timing when the power mode of the apparatus changes to a power saving mode, and acquires from the determining section a determination that the job having been accepted by the accepting section is a reserved low-key print setting job, and
wherein while the apparatus is in the power savings mode the job managing section queues the accepted reserved low-key print setting job for printout, and at least a portion of said queued, reserved low-key print setting job is printed while in power savings mode.

2. The image forming apparatus according to claim 1, wherein the job managing section executes the printout for the reserved low-key print setting job after a relevant user is granted permission.

3. The image forming apparatus according to claim 1, wherein the job managing section acquires a transition status of the power mode of the apparatus from the power mode control section when a determination that the job having been accepted by the accepting section is a plurality of reserved low-key print setting jobs is made, as a result of the determination by the determining section, and also allocates a printout for the plurality of reserved low-key print setting jobs to a time slot at a transition stage among a plurality of transition stages based on the acquired transition status, the transition stage being different from one another.

4. The image forming apparatus according to claim 1, wherein the job managing section provides an index that the reserved low-key print setting job has been completed, after the printout for the reserved low-key print setting job is completed.

5. The image forming apparatus according to claim 1, wherein the job managing section allocates an output destination for the printout for the reserved low-key print setting job to an output destination different from that of ordinary print jobs.

6. The image forming apparatus according to claim 1 having a normal power mode and a plurality of power savings modes, and wherein the power mode control section takes control of changing the power mode of the apparatus from one power savings mode to another power savings mode in response to at least a predetermined time passing without a print job.

7. An image forming apparatus comprising:
an accepting section connected between a plurality of user terminals via a network and accepting print jobs from the plurality of user terminals;
a job managing section managing a plurality of print jobs having been accepted by the accepting section and executing print jobs subjected to management in a predetermined order;
a determining section making a determination on whether a print job having been accepted by the accepting section is a job related to a reserved low-key print setting;
wherein the job managing section acquires an operational status of a standby print job when the determining section makes a determination that the job having been accepted by the accepting section is a reserved low-key print setting job; and
wherein when no print jobs other than one or more standby print jobs are waiting to be printed, and a predetermined time period has expired while said no print jobs other than said one or more standby print jobs are waiting to be printed, such predetermined time period being a period of inactivity upon the expiration of which the apparatus is to be shut down, the job managing section queues the one or more standby print jobs for printout and defers apparatus shut down, and wherein upon completion of printing of the standby print jobs without any additional, accepted print jobs, the apparatus shuts down.

* * * * *